May 26, 1970      DAE SIK KIM      3,513,929

LOW-POLLUTING ENGINE AND DRIVE SYSTEM

Filed Aug. 25, 1967      2 Sheets-Sheet 1

D. S. Kim INVENTOR

BY James F. Bryan

PATENT ATTORNEY

United States Patent Office 3,513,929
Patented May 26, 1970

3,513,929
LOW-POLLUTING ENGINE AND DRIVE SYSTEM
Dae Sik Kim, Maplewood, N.J., assignor to Esso Research and Engineering Company, a corporation of Delaware
Filed Aug. 25, 1967, Ser. No. 663,405
Int. Cl. B60k 3/00
U.S. Cl. 180—66   13 Claims

ABSTRACT OF THE DISCLOSURE

A low-polluting fossil-fueled engine and drive system is achieved by utilizing in combination an internal combustion engine operatively associated with a compressor, an interburner which completes the combustion of unburned hydrocarbons and carbon monoxide from the internal combustion engine, a gas turbine which recovers power from the hot exhaust leaving the interburner and a compressed air reservoir which serves as a power storage tank and which supplies compressed air to a plurality of air motors.

FIELD OF THE INVENTION

This invention relates in general to an internal combustion engine driven power train. More particularly, it relates to an improved engine and drive system which affords high efficiencies of operation while at the same time greatly reducing the amounts of pollutants emitted to the surrounding atmosphere. In its most specific form the invention is directed to a low-polluting gasoline powered engine and drive system for use in an automobile.

During the last fifty years the high compression ratio gasoline engines used in today's automobiles have been improved almost to the point of perfection. Their most desirable performance characteristics are a quick response to level of power and their low wt./H.P. ratio. However, when exhaust emission is considered, the widely variable operating characteristics which are essential to today's directly driven automobile power systems cause difficulties in the design of an optimum exhaust elimination system. To date, various methods of the reduction of exhaust pollutants have been tried. These include, for example, the use of a catalytic afterburner and some recycling of exhaust gases. However, the methods of eliminating pollutants tried to date decrease the driveability of the vehicle; that is, losses are experienced in some of the operating characteristics of the engine and power train.

In the last five years steps have been taken to curb the air pollution due to internal combustion engines. In response to the need for reducing pollution, automobile manufacturers have started installing the so-called "blow-by" devices in most of their models for recirculating and burning gases which escaped from the cylinders passed the pistons. Many of these gases are mainly hydrocarbons that earlier models vented into the atmosphere. However, exhaust pipe gases still remain as the major source of automobile emissions to the atmosphere. These gases include carbon monoxide, nitrogen oxides and hydrocarbons.

The problems encountered in attempting to eliminate exhaust pollution may be understood from the following brief discussion. The power train of the present car is basically a direct drive system and, hence, the operation of its engine must meet all driving conditions. This in turn introduces a tremendous transient variation in the gas flow rates through the engine, in the exhaust temperature and in the exhaust composition. Any device which is attached to such an engine must also be effective under such widely varying conditions. For example, variation in air flow rate may easily be 20 to 50 fold between full throttle operation and idle with the time required for such change being on the order of one second. The difficulty of meeting such adverse requirements is manifested abundantly in the literature. It will also be appreciated that the present configuration of direct drive power trains requires inefficient part-throttle operation for the majority of the time and a large engine capacity (several hundreds of horsepower not being uncommon) which is rarely used or required.

Newer standards for motor vehicle air pollutants are now being developed under the federal "Motor Vehicle Air Pollution Control Act of 1965." In response to this, automobile manufacturers are attempting to provide the necessary controls over such emissions by various methods, such as the one cited above and other modifications of the engine. While work is also proceeding on new drives based on fuel cells, large capacity electric storage batteries, and even solar energy systems, it will be understood that these are still in the earliest stages of development. It must, therefore, be appreciated that the burning of highly refined fossil fuels still remains and will remain for many years to come at the heart of the motor vehicle industry.

SUMMARY OF THE INVENTION

The device of the instant invention is thus directed towards achieving substantial reduction in the pollutants emitted by a fossil fuel (e.g. gasoline) powered internal combustion engine and drive system. This, according to the teachings of the instant invention, is accomplished by utilizing an interburner, a single stage turbine, an air compressor, and an air storage tank in combination with the internal combustion engine. The engine may, for example, be operated with about a 10:1 air-to-fuel ratio and the interburner then serves to complete the combustion of unburned hydrocarbons and carbon monoxide with additional air being supplied by an air blower driven by the single stage turbine. The single stage turbine recovers power from the hot exhaust leaving the interburner. The air blower further supplies compressed air to the compressor. The turbine may also be used to supply power to a generator and water pump of a conventional type.

When used in an automobile, power may be delivered to the wheels through a series of wheel-mounted air motors or a single partial admission impact turbine with a proper reduction system. These motors or the impact turbine are, of course, driven by compressed air supplied by the compressor. The compressed air tank serves as a power storage tank and supplies compressed air for peak demand, e.g. during acceleration as well as the power required for ordinary operation. When the wheel-mounted air motors are used, the engine and drive system of the instant invention eliminates the transmission, differential and drive shaft necessary in current automobiles. At the same time four wheel traction may be provided and a savings in weight and maintenance costs may be achieved. In this regard, in a preferred embodiment it is envisioned that the compressed air tank required for the system can be integrated with existing structural members in an automobile, thus achieving additional savings in weight.

It will be appreciated by those skilled in the art that the operation of the engine may be automatically controlled by the pressure of the compressed air in its storage tank. The driver would only have to control a suitable valve on the inlet of the air motors or impact turbine to regulate the air flow to and, hence, the speed of the wheel mounted air motors or impact turbine. The device of the instant invention provides better acceleration characteristics, which are limited only by the capacity of the compressed air storage tank and the size of the air turbine while allowing the use of an optimum sized engine which may be quite small and very economical at an efficient, steady full throttle operation. Thus, aside from its low pollution aspects, the instant invention offers great advantages in that it eliminates both the need for a large engine whose peak output is rarely used and a conventional transmission. It will be understood that the system herein described is eliminating transient situations which are constantly occurring in today's high compression internal combustion engines and their drive systems during city driving and replacing them with a capacitive storage system which can furnish the transient energy demands when required.

Thus, it is an object of the instant invention to provide a low-polluting, fossil-fuel powered engine and drive system.

Another object is to provide a low-polluting gasoline powered engine and drive system for use in an automobile or other vehicle.

Yet, another object is to provide a drive system which has excellent driveability, i.e. high tractability and high peak power reserves, which can eliminate many of the standard drive components present in today's vehicles and which allows the use of smaller engines.

These and other objects as well as a fuller understanding of the invention may be had by reference to the accompanying detailed description and by referring to the drawings in which:

BRIEF DESCRIPTION OF THE DRAWINGS

Referring to FIG. 1 in detail, a fuel, e.g. gasoline, and fresh air are introduced into an internal combustion engine through the lines 1 and 3 respectively. These are mixed in a carburetor (not shown) so that an air/fuel ratio in the range of 8:1 to 12:1 and preferably about 10:1 exists. The exhaust gases leaving the engine via the conduit 10 are thus rich in unburned hydrocarbons and carbon monoxide. A negligent amount of the oxides of nitrogen is also present. The gases in conduit 10 are in the temperature range from about 1800 to 2100° R. and preferably about 2000° R. and are at a pressure in the range of from about 2 to 5 atmospheres and preferably about 4 atmospheres. From conduit 10 these hot exhaust gases enter an interburner 8 where sufficient air having a pressure in the range from about 2 to 5 atmospheres and preferably at about 4 atmospheres is introduced via the line 12 to result in an air-to-fuel ratio in interburner 8 in the range of about 30:1 to 50:1 and preferably about 40:1. The introduction of this large excess of air into interburner 8 results in drastic reductions in the amount of unburned hydrocarbons and residual carbon monoxide present in the exhaust gas without forming oxides of nitrogen. The entering air also causes a decrease in the temperature so that the gases leaving interburner 8 through the line 9 have a temperature in the range from about 1400 to about 1800° and preferably in the range of about 1400 to 1600° F. By maintaining the temperature in the range of about 1400 to 1600° F. the use of high temperature alloys is avoided in the single stage turbine 20. The gases from line 9 are conducted into an inlet 26 of the single stage turbine 20 which is operated so that the ratio of inlet pressure to outlet pressure is in the range from about 5:1 to about 2:1 and preferably in the range of about 4:1. Single stage turbine 20 recovers the energy from the hot exhaust gases and the power so recovered is transmitted via the shaft 32 to an air blower 16 and other auxiliary equipment such as water pump 28 and generator 30. Water pump 28 and generator 30 may be driven by a series of pulleys as indicated in FIG. 1. The fully expanded gases leave turbine 20 through the outlet 24 and are then exhausted to the atmosphere or partially recycled via the line 22 to internal combustion engine 2. It will be appreciated by those skilled in the art that the power level of the internal combustion engine can be controlled by properly proportioning the recycle in line 22 with the fresh ambient air. This proportioning could be easily accomplished by means of a control valve (not shown) on line 22, which is responsive to the pressure in tank 40.

As will be further discussed, the formation of nitrogen oxides in an internal combustion engine is almost unavoidable. Whenever high temperature flames are present, these oxides will be formed. However, one way of minimizing this formation is carrying out the combustion under a reducing atmosphere; that is, under fuel rich operations. This brings about predominantly those reactions which tend to consume carbon monoxide and the hydrocarbons thus starving oxygen to the nitrogen oxide reactions. Any unburned hydrocarbons and carbon monoxide formed under fuel rich conditions are eliminated as hereinbefore discussed in the interburner 8 without materially raising nitrogen oxide levels.

Figure 1:
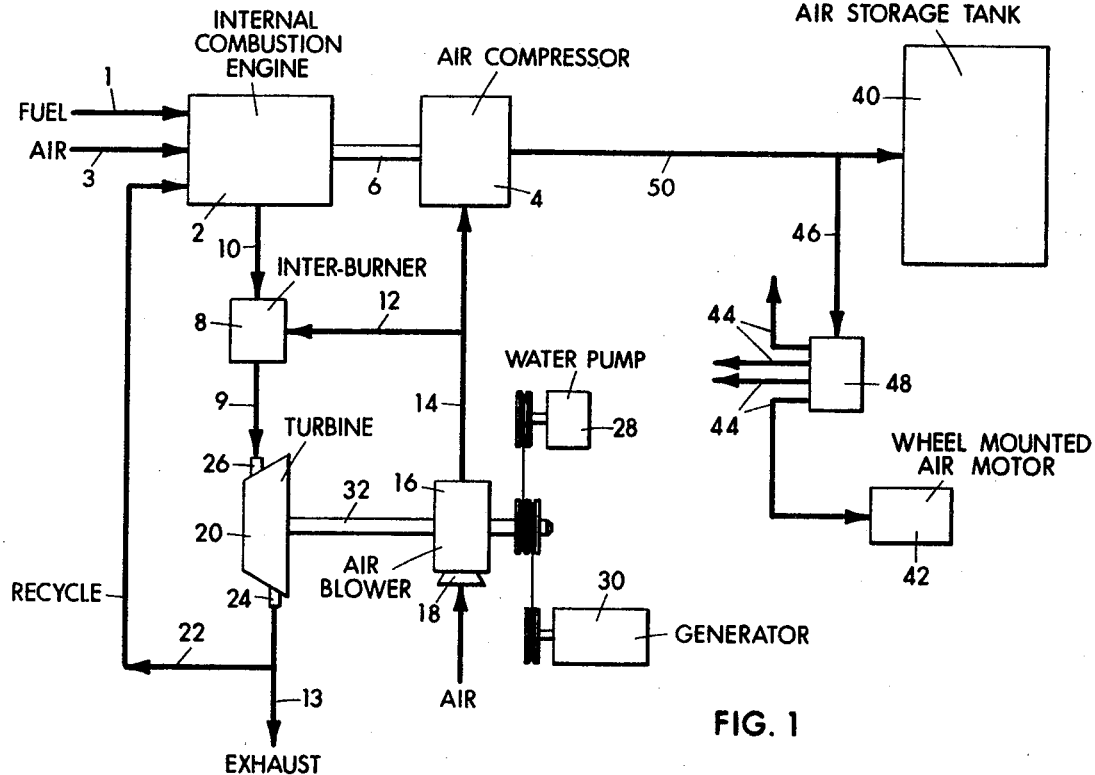
FIG. 1 is a diagrammatic representation of the low-polluting engine and drive system of the instant invention.

Returning to the discussion of FIG. 1, it is seen that the shaft 32 drives an air blower 16. Air blower 16 draws in fresh air through inlet 18 and delivers this air at an increased pressure in the range from about 2 to about 5 atmospheres and preferably at about 4 atmospheres through the line 14 to air compressor 5. It also supplies air via the lines 14 and 12 to the interburner 8 as hereinbefore mentioned. Air compressor 4 is designed to operate with inlet pressures to outlet pressures in the range 1:3 through about 1:6 and preferably about 1:5. Thus, with air entering the line 14 at about 4 atmospheres the outlet line 50 from compressor 4 will contain air in the range of about 20 atmospheres pressure. Line 50 is in communication with an air storage tank 40. Under normal operating conditions this tank is fully charged and delivers compressed air through the line 46 and the valve 48 and the lines 44 to a series of air motors (only one of which is shown) 42 or turbine which represent the final drive element. It will be appreciated that the valve 48 may be effectively used as a throttle and during periods of peak demand, for example, during acceleration, valve 48 would be opened to a substantial extent thus allowing the energy represented by the compressed air in tank 40 to be delivered to the drive turbines 42.

It may be calculated that if air tank 40 has a capacity of approximately 50 cubic feet and the air in the tank were under a pressure of about 20 atmospheres, the usable stored energy would be equivalent to about 150 H.P. minutes. To put this in its proper prospective, the H.P. minutes of energy necessary to accelerate a car weighing approximately 4000 lbs. from a standing start to 60 M.P.H. is somewhere in the range of 20 H.P. minutes. While this figure is subject to slight changes, it is more or less independent of the total time elapsed.

While a separate air compressor has been shown in FIG. 1 being driven by the internal combustion engine 2, it would be readily appreciated by those skilled in the art that these two units could be combined and in effect the net result could be achieved by the use of a free piston engine; that is, an engine having a power portion and a compression portion. In this regard, it is to be pointed out that both two and four cycle free piston engines could be advantageously and suitably used due to their efficiency in producing high pressure compressed air and due to their mechanical simplicity. It will also be appreciated that a small engine rated, for example, at 60 dynamometer H.P., which corresponds to about 40 axle H.P., could be used to achieve the same degree of driveability now obtained using engines having dynamometer horsepower ratings in the range of 200–300. It has been estimated that a 4000 lb. vehicle requires 40 axle horsepower to maintain a steady speed of 80 m.p.h. Since vehicles of this type frequency have large engines often having dynamometer horsepower ratings of about 300 (producing axle horsepowers of about 200), the differential in axle horsepower is not used except during periods of maximum acceleration.

The following advantages can be obtained by employing a free piston engine in the system of the instant invention: The ability to vary the compression ratio; a low horsepower-to-weight ratio due to the elimination of the engine crank shaft and compressor drive shaft, since the compressor and engine are in a single unit; high operational flexibility and multifuel capacity (i.e. either diesel or spark ignition); low conversion loss by direct compression of air in the same cylinder and by the same piston; and independent operation of each unit. In regard to this last mentioned point, the independent operation feature of the free piston engine is particularly useful for pollutant control. For example, if a total steady lower level of 60 dynamometer H.P. is required and working with the conditions hereinbefore discussed (i.e. 10:1 air-to-fuel ratio) the turbine 20 will provide about one-third of the required power, remaining two-thirds (40 H.P.) being provided by the free pistons. Since a free piston engine can operate independently, this power can be produced by two independent 20 H.P. free piston engines rather than a single 40 H.P. unit. In city driving, only one of these 20 H.P. engines and part load operation of the turbine 20 can provide a 30 H.P. system. This power level can be reduced by higher exhaust recycle when the steady demand is low. This is a feature which the common engine cannot provide and which would allow a small city car which would be optimum from both the pollution and performance standpoints. A simultaneous two engine operation as just discussed can be automatically actuated by the pressure in tank 40. Other advantages of this two engine system would include increased reliability (i.e. non-stalling) and its resulting safety.

Figure 2:
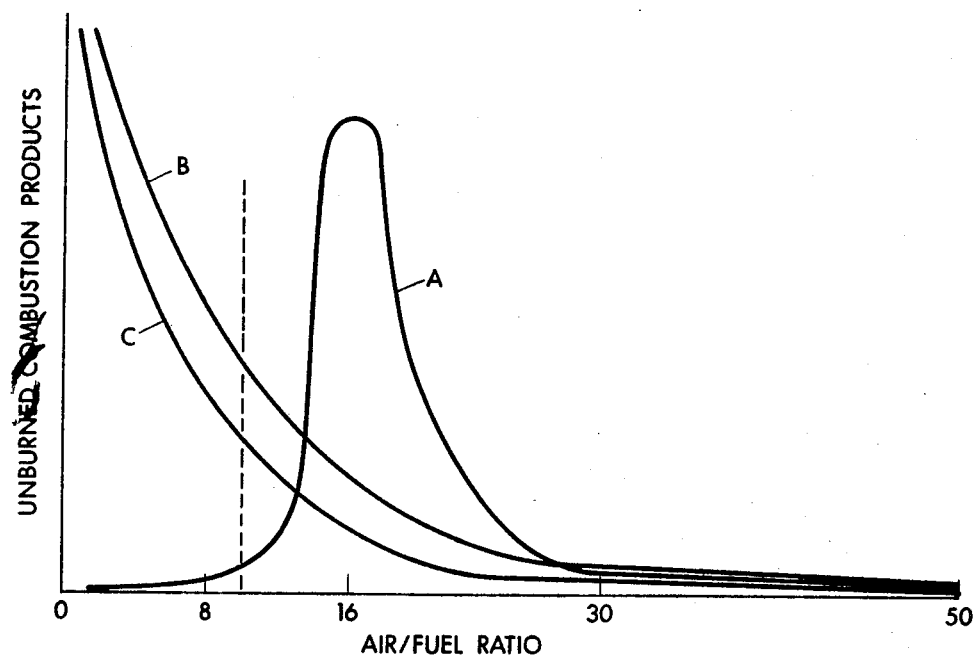
FIG. 2 is a graph depicting the relationship between the air/fuel ratio and the amounts of various combustion products present in the exhaust of an internal combustion engine.

Reference will now be had to FIG. 2 to explain in greater detail how the engine and drive system of the instant invention reduces exhaust pollutions. Three curves A, B and C representing respectively the amount of oxides of nitrogen, carbon monoxide and hydrocarbons present in the exhaust gases of an internal combustion engine under varying air-to-fuel ratios are shown. By referring to these curves, the manner in which the instant engine and drive system reduces the amount of pollutants will become clear. Thus, in the combustion step taking place in engine 2, it has been indicated that the air-to-fuel ratio is in the range of about 8:1 to 12:1 and preferably about 10:1 as indicated by the dotted line. This then produces exhaust gases which have a substantial percentage of unburned hydrocarbons and carbon monoxide and a small amount of nitrogen oxides. This is in contrast to today's standard automobile engines which operate with air-to-fuel ratios somewhat higher, e.g. in the range of 12 to 15:1, which again referring to the curve would give somewhat less amounts of the carbon monoxide and hydrocarbons but would greatly increase the amount of oxides of nitrogen present. Upon exiting from the internal combustion engine, the exhaust gases of the instant invention are as hereinbefore mentioned introduced into an interburner. It will be recalled that this interburner is operated so thatt the air-to-fuel ratio is in the range of about 30:1 to 50:1. Again by referring to FIG. 2, it is seen that by operating at these high air-to-fuel ratios the amounts of carbon monoxide and hydrocarbons present are greatly reduced without materially changing the level of nitrogen oxides present. Thus, by operating the instant invention in the manner hereinbefore described, the pollutants of the exhaust gas are greatly reduced in comparison to what is currently available with today's common internal combustion engines. Table I below presents a comparison of the amount of pollutants present in the exhaust of the instant engine and drive system as compared to those present in the exhaust of current internal combustion engines operating at their most efficient level and also under poor conditions. This table illustrates dramatically the reduction in exhaust gas pollutants which may be obtained using the device and teachings of the instant applications.

TABLE I

| Pollutant | Device of instant invention | Int. combustion engine | |
|---|---|---|---|
| | | Efficient levels | Poor conditions |
| Hydrocarbons (p.p.m.) | ~2 | ~800 | 1,000 |
| Carbon monoxide, percent | Trace | 4 | 6 |
| Nitrogen Oxides (p.p.m.) | ~20 | 2,000 | 5,000 |

Figure 3:
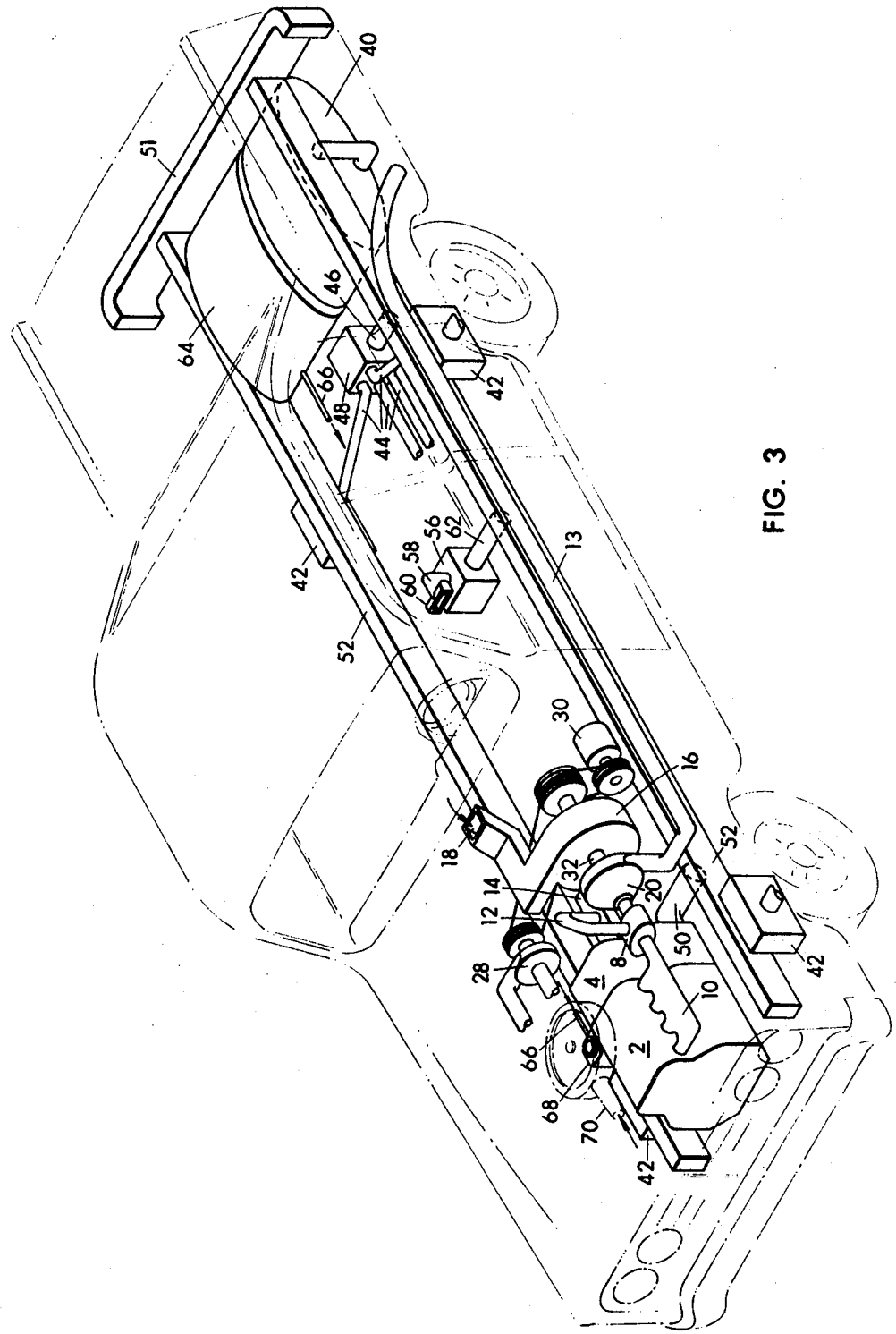
FIG. 3 depicts schematically the use of the instant invention in an automobile.

FIG. 3 illustrates diagrammatically an automobile utilizing the engine and drive system of the instant invention. In operation fuel contained in a fuel tank 64 is fed through the line 66 to a carburetor 68 where it is mixed with air entering through the line 70, the air-to-fuel ratio being set at about 10:1 by the carburetor 68. This fuel rich mixture then flows into the engine 2 which either drives a compressor 4, or in the case where a free piston engine is employed, compresses the air itself. Hot exhaust gases flow through the manifold 10 into the interburner 8 and then through the turbine 20 as hereinbefore described. The turbine 20 drives an air blower 16 through the shaft 32 and supplies the power for a generator 30 and a water pump 28 through a power train comprising a series of belts and pulleys. The exhaust from the turbine leaves through the exhaust pipe 13 which exits the gas at the rear of the car.

Blower 16 having an inlet 18 supplies air to the compressor 4 through the conduit 14 and also serves to supply air to the interburner 8 through the conduit 12. This air in the preferred embodiment has a pressure in the range of about 4 atmospheres. Compressor 4, which preferentially operates with an outlet-to-inlet pressure ratio of about 5:1, compresses the air to about 20 atmospheres and this compressed air is fed through conduit 50 to an air storage chamber. As illustrated in FIG. 3, this chamber may be composed in part of the structural members of the car itself. Thus, channel members 52 may be suitably formed so as to contain air at the requisite pressures. These channel members, if desired, can be in communication with bumper 51 which may also be fabricated so as to contain air. If additional air storage capacity is required, the structural members and the bumpers may be in communication with an air storage tank 40. Thus, the instant application envisions the utilization of the various structural components present in today's automobile to provide storage space for compressed air. It is possible that the entire air storage capacity needed could be obtained by suitable use of the various structural components present in the car without the need for providing an auxiliary tank as illustrated.

During normal operation the engine 2 and, hence, compressor 4 are run at constant speed and the air tank 40 and its associated storage members, e.g. 52 and 51, are normally filled. Thus, compressed air leaves the line 44 and is regulated by a suitable valving arrangement indicated schematically at 48 from where it is led through a plurality of lines 44 to air turbines 42 situated on the axle of each of the wheels of the vehicle. It will be understood that the vehicle can readily be designed to be a four-wheel driven vehicle or to have front wheel drive or rear wheel drive or any combination thereof. During conditons of peak demand, e.g. acceleration, the valving arrangement 48 can be automatically controlled so that full power is delivered to each of the wheel turbines 42. Similarly, when the car is at idle and storage tank 40 is at full capacity, the power output of the engine and compressor may be suitably adjusted as hereinbefore discussed.

In addition to the advantages affording a high efficiency, low-polluting engine and drive system as hereinbefore discussed, the instant system possesses the further advantage of being readily adaptable so as to provide the power for accessories which are becoming standard on many of today's vehicles. Thus, for example, the compressed air from the storage system 40 may be used to supply the energy for power brakes and power steering through the use of a suitable valving arrangement and air pistons and cylinders (not shown).

Another advantage is the simplicity with which this system may be adapted to supply air conditioning for the interior of the vehicle. Thus, if air conditioning were desired, it could readily be accomplished by simply adding a take-off line 62 from the compressed air storage and expanding this through a suitable expansion valve 56, then leading the expanded and hence cooled air through a conduit 60 and then through an inlet manifold 58.

Although the foregoing invention has been described in some detail by way of illustration and examples for purposes of clarity and understanding, it should be understood that certain changes and modifications may be practiced within the spirit of the invention. For example, using the same general arrangement of the internal combustion engine, interburner, and turbine (thus retaining the low-polluting characteristics of the primary power supply) the air compressor, air blower, air storage, and the air motors could be replaced by another type of energy conversion and storage means. Thus, the air compressor and the air blower could be replaced by electric generators for converting the shaft power derived from the internal combustion engine and turbine into the electrical energy. This energy could then be stored in a storage battery bank which in turn could drive a plurality of electric motors for driving the car.

What is claimed is:

1. In an automobile of the type having a free piston internal combustion engine, said engine having a power portion and a compression portion, the improvement which comprises in combination, an interburner for receiving exhaust gases from the power portion of said engine, said interburner having an outlet, a turbine having an inlet in communication with the outlet of said interburner, an air blower driven by the power recovered by said turbine for supplying air under pressure to said compressor portion and to said interburner, a compressed air reservoir for receiving compressed air from said compessor portion and a plurality of air motors driven by the compressed air from said air reservoirs for driving said automobile.

2. The combination of claim 1 further characterized in that said compressed air reservoir forms a portion of the structural members of said automobile.

3. The combination of claim 2 wherein said automobile is equipped with bumpers, said bumpers being hollow and forming part of said air reservoir.

4. A process for obtaining power using a gasoline fuel which comprises the folowing steps in combination:
(a) injecting a fuel rich mixture having an air-to-fuel ratio in the range of 8:1 to 12:1 into the combustion chambers of an internal combustion engine, thereby producing an exhaust gas rich in unburned hydrocarbons and carbon monoxide;
(b) introducing said exhaust gas into an interburner and completing the combustion of said hydrocarbons and carbon monoxide by introducing excess air into said interburner whereby an air-to-fuel ratio of 25:1 to 50:1 is obtained in said interburner;
(c) passing the hot gases from said interburner through a gas turbine whereby power is recovered therefrom;
(d) utilizing the power recovered in step (c) to drive an air blower which supplies compressed air having a pressure in the range from about 2 atmospheres to about 5 atmospheres to said interburner and to a compressor driven by said engine;
(e) further compressing the air from step (d) in said compressor to a pressure in the range of from about 15 to about 25 atmospheres; and
(f) using the further compressed air to supply the driving power for a plurality of air motors or impact turbine.

5. The process of claim 4 further characterized in that said fuel rich mixture has an air-to-fuel ratio of about 10:1, the interburner is fired with an air-to-fuel ratio of about 35.1, said blower supplies air having a pressure of about 4 atmospheres and said further compressing produces air at a pressure of about 20 atmospheres.

6. The process of claim 5 further characterized in that the exhaust gas leaving said internal combustion engine is at a temperature of from about 1800 to 2100° R, and a pressure of about 4 atmospheres, the gas exiting said interburner has a temperature in the range of from about 1400° to about 1600° R. and said turbine is a single stage turbine having an inlet pressure to outlet pressure ratio of about 4:1.

7. A method for reducing pollution from an automobile having a gasoline fueled internal combustion engine which comprises the following steps in combination:
(a) burning a fuel rich gasoline/air mixture in said engine;
(b) further combusting the exhaust gases from said engine in a large excess of air;
(c) recovering power from the further combusted gases resulting from step (b) in a turbine;
(d) utilizing the power recovered in step (c) to drive an air blower for supplying the excess of air used in step (b) and for supplying air to a compressor driven by said engine; and
(e) using compressed air produced by said compressor to supply the power to drive at least one air motor which in turn drives the wheels of said automobile.

8. A drive system which comprises in combination:
(a) an internal combustion engine having an inlet for air and fuel and an outlet for exhaust gases;
(b) an interburner having an inlet in communication with said exhust gas outlet, said interburner completing the combustion of unburned fuel and having an outlet for exiting hot gases;
(c) a gas turbine having an inlet in communication with the outlet of said interburner, said turbine recovering power from said hot gases;
(d) an air blower driven by said turbine and supplying air to said interburner;
(e) an air compressor directly coupled to the shaft of said internal combustion engine so as to be driven thereby and adapted to receive a portion of the air exiting said air blower;
(f) motor means adapted to be driven by the compressed air produced by said compressor.

9. The system of claim 8 which includes storage means for storing the compressed air produced by said compressor and said motor means are adapted to be driven by said stored compressed air.

10. A drive system according to claim 9 wherein said internal combustion engine is operated at an air-to-fuel ratio in the range of from about 8:1 to about 12:1 and said interburner is operated at an air-to-fuel ratio in the range of from about 30:1 to about 50:1.

11. A process for obtaining power using a gasoline fuel which comprises the following steps in combination:
(a) injecting a fuel rich mixture into the combustion chambers of an internal combustion engine, thereby producing an exhaust gas rich in unburned hydrocarbons and carbon monoxide;
(b) introducing said exhaust gas into an interburner and completing the combustion of said hydrocarbons and carbon monoxide by introducing excess air into said interburner whereby an air-to-fuel ratio of 25:1 to 50:1 is obtained in said interburner;

(c) passing the hot gases from said interburner through a gas turbine whereby power is recovered therefrom;

(d) utilizing the power recovered in step (c) to drive an air blower which supplies compressed air having a pressure in the range from about 2 atmospheres to about 5 atmospheres to said interburner and to a compressor driven by said engine;

(e) further compressing the air from step (d) in said compressor to a pressure in the range of from about 15 to about 25 atmospheres; and (f) using the further compressed air to supply the driving power for a plurality of air motors or impact turbine.

12. The process of claim 11 further characterized in that said fuel rich mixture has an air-to-fuel ratio of about 10:1, the interburner is fired with an air-to-fuel ratio of about 35:1, said blower supplies air having a pressure of about 4 atmospheres and said further compressing produces air at a pressure of about 20 atmospheres.

13. The process of claim 12 further characterized in that the exhaust gas leaving said internal combustion engine is at a temperature of from about 1800 to 2100° R. and a pressure of about 4 atmospheres, the gas exiting said interburner has a temperature in the range of from about 1400° to about 1600° R. and said turbine is a single stage turbine having an inlet pressure to outlet pressure ratio of about 4:1.

References Cited

UNITED STATES PATENTS

| | | | |
|---|---|---|---|
| 859,235 | 7/1907 | Macfarren | 180—66 XR |
| 1,831,983 | 11/1931 | Wheeler | 180—66 |
| 1,963,091 | 6/1934 | Jenkins | 180—66 |
| 2,581,600 | 1/1952 | Pescara | 60—13 |
| 2,628,015 | 2/1953 | Neugebauer et al. | 230—56 |
| 2,851,254 | 9/1958 | Messinger et al. | 62—244 X |
| 2,898,745 | 8/1959 | Weisel | 62—243 X |
| 3,204,859 | 9/1965 | Crooks | 230—56 |
| 3,380,245 | 4/1968 | Mick | 60—30 X |

FOREIGN PATENTS

| | | |
|---|---|---|
| 1,012,305 | 4/1952 | France. |
| 1,254,163 | 1/1961 | France. |
| 321,933 | 11/1929 | Great Britain. |

BENJAMIN HERSH, Primary Examiner

M. L. SMITH, Assistant Examiner

U.S. Cl. X.R.

60—13, 19, 62